(12) United States Patent
Guthrie et al.

(10) Patent No.: US 7,543,116 B2
(45) Date of Patent: Jun. 2, 2009

(54) DATA PROCESSING SYSTEM, CACHE SYSTEM AND METHOD FOR HANDLING A FLUSH OPERATION IN A DATA PROCESSING SYSTEM HAVING MULTIPLE COHERENCY DOMAINS

(75) Inventors: Guy L. Guthrie, Austin, TX (US); John T. Hollaway, Jr., Austin, TX (US); William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/342,951

(22) Filed: Jan. 30, 2006

(65) Prior Publication Data

US 2007/0180196 A1    Aug. 2, 2007

(51) Int. Cl.
*G06F 12/00* (2006.01)
(52) U.S. Cl. .................. 711/141; 711/135; 711/144; 711/156
(58) Field of Classification Search .................. 711/141
See application file for complete search history.

(56) References Cited

U.S. PATENT DOCUMENTS 6,631,447 B1 * 10/2003 Morioka et al. ............. 711/141
2003/0009635 A1 * 1/2003 Arimilli et al. ............. 711/141
2006/0179241 A1 * 8/2006 Clark et al. ................. 711/141
2006/0179249 A1 * 8/2006 Fields et al. ................ 711/141
2006/0271743 A1 * 11/2006 Clark et al. ................. 711/141

* cited by examiner

*Primary Examiner*—Kevin L Ellis
*Assistant Examiner*—Kalpit Parikh
(74) *Attorney, Agent, or Firm*—Dillon & Yudell LLP

(57) ABSTRACT

A cache coherent data processing system includes at least first and second coherency domains. The first coherency domain contains a memory controller, an associated system memory having a target memory block identified by a target address, and a domain indicator indicating whether the target memory block is cached outside the first coherency domain. During operation, the first coherency domain receives a flush operation broadcast to the first and second coherency domains, where the flush operation specifies the target address of the target memory block. The first coherency domain also receives a combined response for the flush operation representing a system-wide response to the flush operation. In response to receipt in the first coherency domain of the combined response, a determination is made if the combined response indicates that a cached copy of the target memory block may remain within the data processing system. In response to a determination that the combined response indicates that a cached copy of the target memory block may remain in the data processing system, the domain indicator is updated to indicate that the target memory block is cached outside of the first coherency domain.

1 Claim, 12 Drawing Sheets

US 7,543,116 B2

DATA PROCESSING SYSTEM, CACHE SYSTEM AND METHOD FOR HANDLING A FLUSH OPERATION IN A DATA PROCESSING SYSTEM HAVING MULTIPLE COHERENCY DOMAINS

CROSS-REFERENCE TO RELATED APPLICATION(S)

The present application is related to the following pending patent application, which is assigned to the assignee of the present invention and incorporated herein by reference in its entirety:

U.S. patent application Ser. No. 11/055,305.

BACKGROUND OF THE INVENTION

1. Technical Field

The present invention relates in general to data processing and, in particular, to data processing in a cache coherent data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherency states stored in association with the cache lines of each cache hierarchy, as well as a set of coherency messages utilized to communicate the cache state information between cache hierarchies. In a typical implementation, the coherency state information takes the form of the well-known MESI (Modified, Exclusive, Shared, Invalid) protocol or a variant thereof, and the coherency messages indicate a protocol-defined coherency state transition in the cache hierarchy of the requestor and/or the recipients of a memory access request.

SUMMARY OF THE INVENTION

In view of the foregoing, the present invention provides an improved cache coherent data processing system, cache system and method of data processing in a cache coherent data processing system.

In one embodiment, a cache coherent data processing system includes at least first and second coherency domains. The first coherency domain contains a memory controller, an associated system memory having a target memory block identified by a target address, and a domain indicator indicating whether the target memory block is cached outside the first coherency domain. During operation, the first coherency domain receives a flush operation broadcast to the first and second coherency domains, where the flush operation specifies the target address of the target memory block. The first coherency domain also receives a combined response for the flush operation representing a system-wide response to the flush operation. In response to receipt in the first coherency domain of the combined response, a determination is made if the combined response indicates that a cached copy of the target memory block may remain within the data processing system. In response to a determination that the combined response indicates that a cached copy of the target memory block may remain in the data processing system, the domain indicator is updated to indicate that the target memory block is cached outside of the first coherency domain.

In at least some embodiments, the flush operation is reissued until the master that initiated the flush operation can be granted coherency ownership of the target memory block. Thereafter, the master issues one or more kill operations, if necessary, to flush shared cached copies of the target memory block from the data processing system. Granting coherency ownership to the master that initiated the flush operation ensures that the flush operation can make forward progress in the presence of read operations that can multiply the number of shared cached copies of the target memory block. To grant coherency ownership to the master, the domain indicator is updated, if necessary, at the home system memory so that any operations that conflict with the flush operation are snooped and retried by the master of the flush operation.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

I. Exemplary Data Processing System

Figure 1:
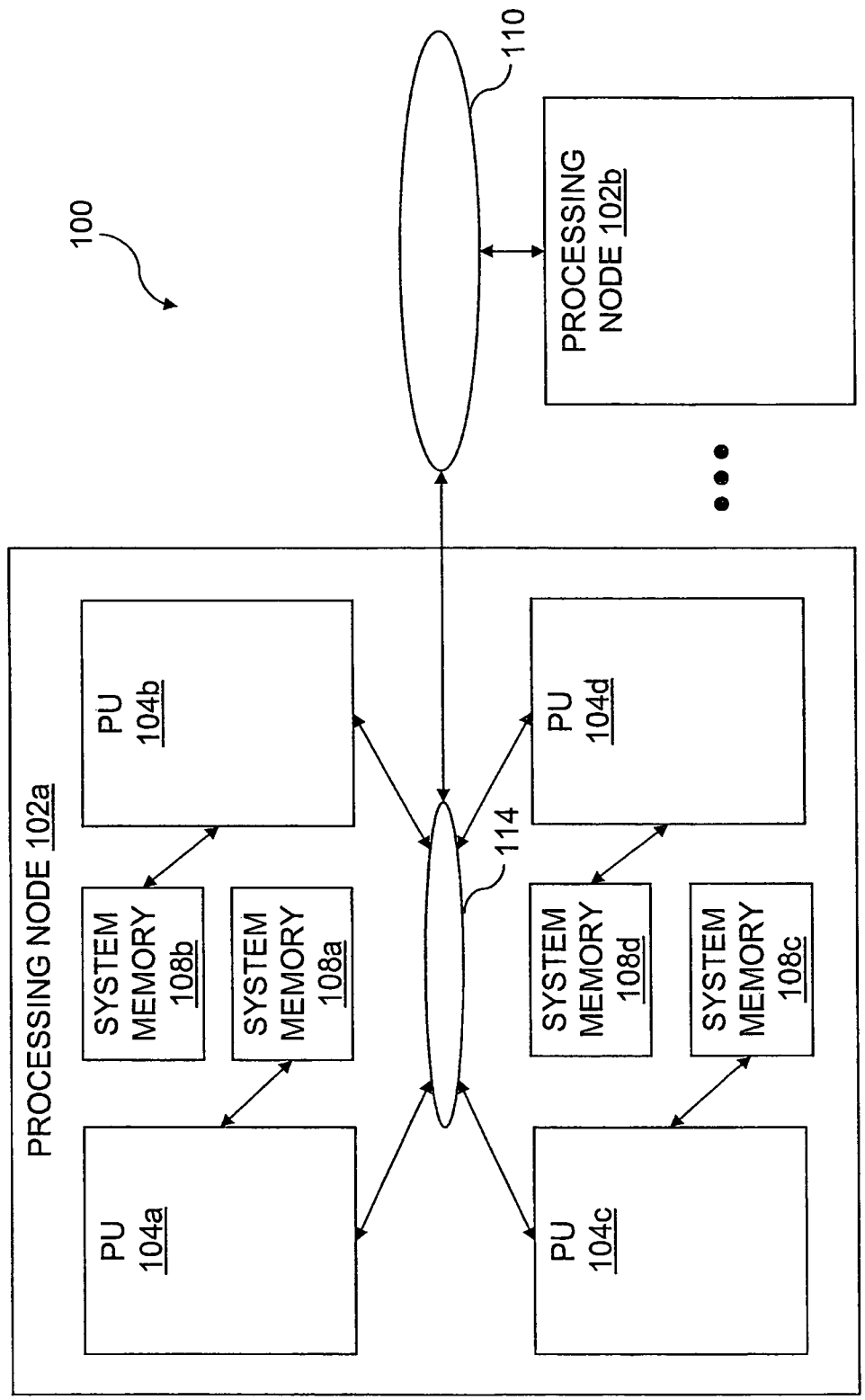
FIG. 1 is a high level block diagram of an exemplary data processing system in accordance with the present invention.

With reference now to the figures and, in particular, with reference to FIG. 1, there is illustrated a high level block diagram of an exemplary embodiment of a cache coherent symmetric multiprocessor (SMP) data processing system in accordance with the present invention. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core in any processing unit 104 in any processing node 102 of data processing system 100. In alternative embodiments of the invention, one or more system memories 108 can be coupled to system interconnect 110 rather than a local interconnect 114.

Those skilled in the art will appreciate that SMP data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Figure 2:
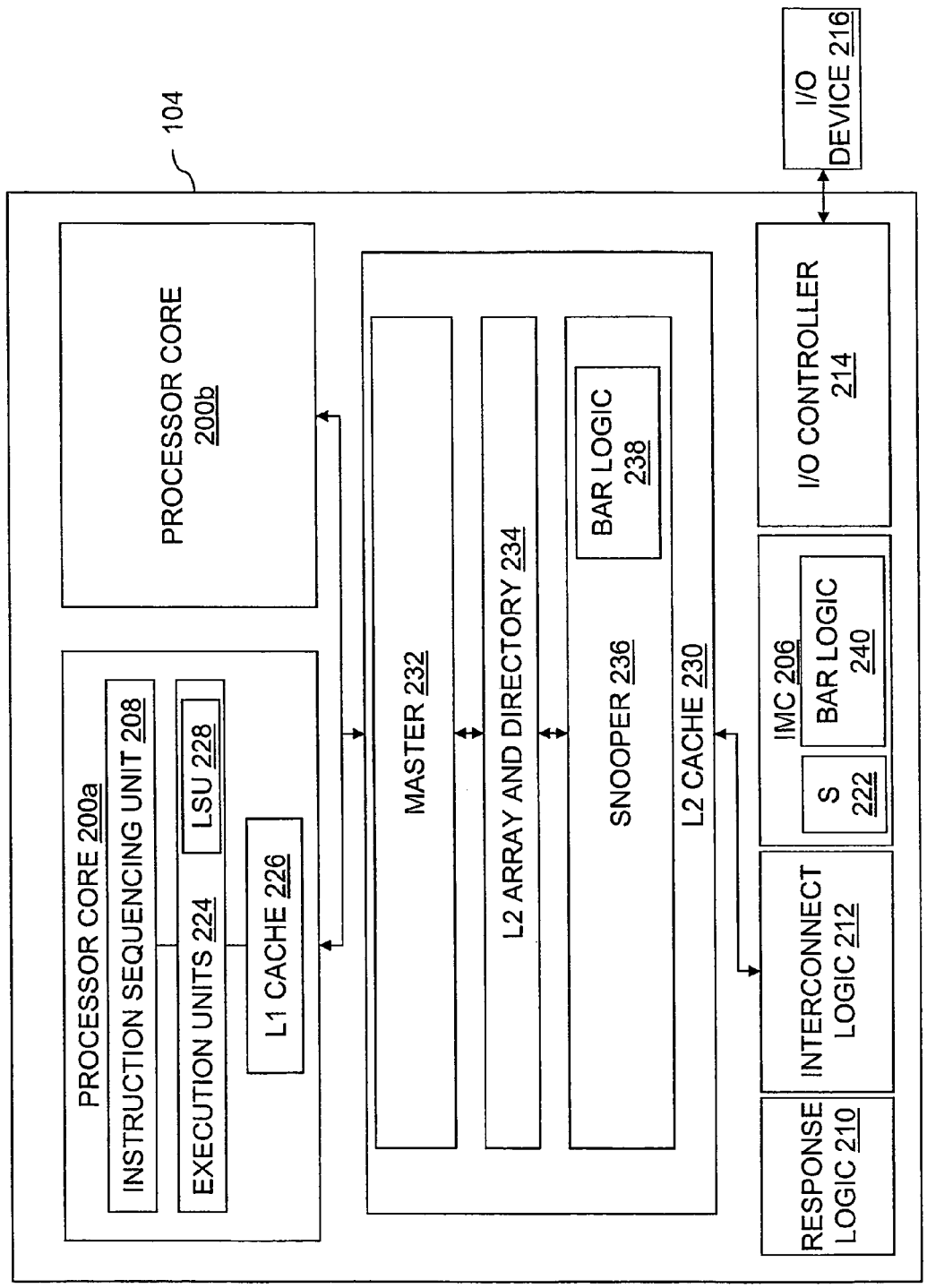
FIG. 2 is a more detailed block diagram of a processing unit in accordance with the present invention.

Referring now to FIG. 2, there is depicted a more detailed block diagram of an exemplary processing unit 104 in accordance with the present invention. In the depicted embodiment, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. As discussed further below, execution units 224 preferably include a load-store unit (LSU) 228 for executing memory access instructions that references a memory block or cause the generation of an operation referencing a memory block.

The operation of each processor core 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 102 in response to requests received from processor cores 200a-200b and operations snooped by snoopers (S) 222 on the local interconnect 114. IMC 206 includes base address register (BAR) logic 240, which includes range registers defining the addresses for which that IMC 206 is responsible.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234 and a cache controller comprising a master 232 and a snooper 236. Master 232 initiates transactions on local interconnect 114 and system interconnect 110 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations. Snooper 236 includes BAR logic 238 that indicates the addresses for which the IMC 206 of its processing unit 104 is responsible.

Although the illustrated cache hierarchy includes only two levels of cache, those skilled in the art will appreciate that alternative embodiments may include additional levels (L3, L4, L5 etc.) of on-chip or off-chip in-line or lookaside cache, which may be fully inclusive, partially inclusive, or non-inclusive of the contents the upper levels of cache.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for selectively forwarding communications between its local interconnect 114 and system interconnect 110. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
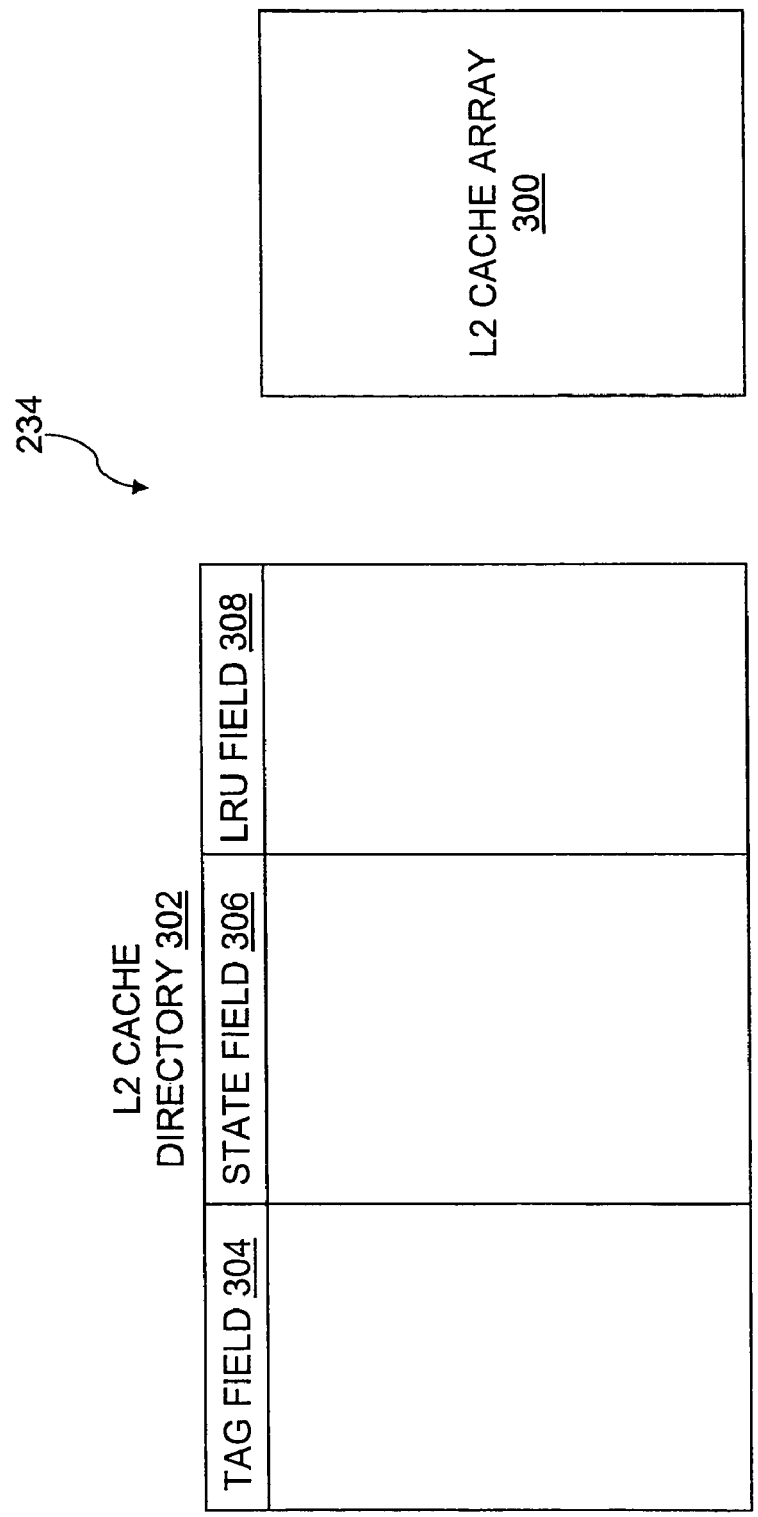
FIG. 3 is a more detailed block diagram of the L2 cache array and directory depicted in FIG. 2.

With reference now to FIG. 3, there is illustrated a more detailed block diagram of an exemplary embodiment of L2 array and directory 234. As illustrated, L2 array and directory 234 includes a set associative L2 cache array 300 and an L2 cache directory 302 of the contents of L2 cache array 300. As in conventional set associative caches, memory locations in system memories 108 are mapped to particular congruence classes within cache arrays 300 utilizing predetermined index bits within the system memory (real) addresses. The particular cache lines stored within cache array 300 are recorded in cache directory 302, which contains one directory entry for each cache line in cache array 300. As understood by those skilled in the art, each directory entry in cache directory 302 comprises at least a tag field 304, which specifies the particular cache line stored in cache array 300 utilizing a tag portion of the corresponding real address, a state field 306, which indicates the coherency state of the cache line, and a LRU (Least Recently Used) field 308 indicating a replacement order for the cache line with respect to other cache lines in the same congruence class.

II. Exemplary Operation

Figure 4:
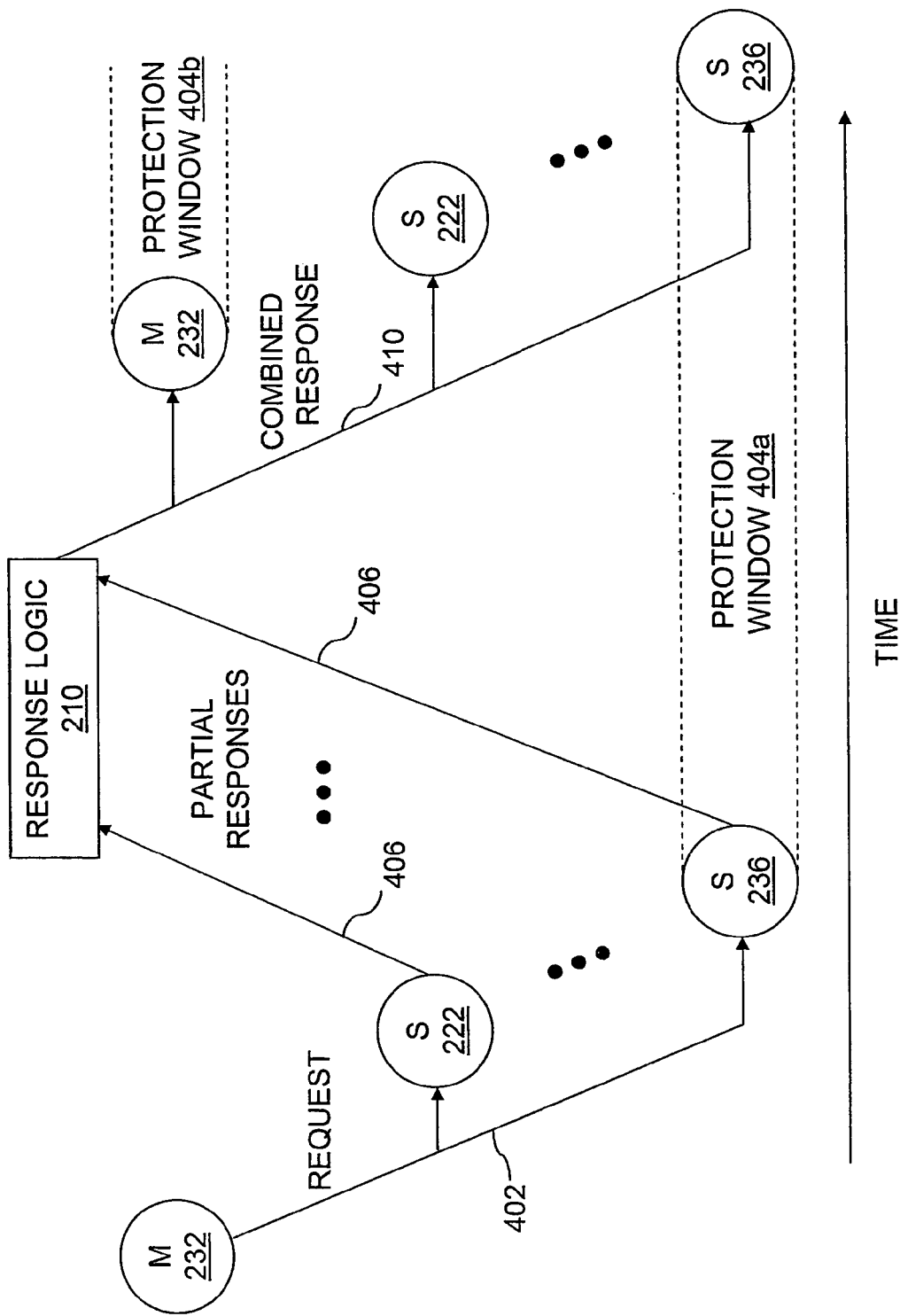
FIG. 4 is a time-space diagram of an exemplary transaction on the system interconnect of the data processing system of FIG. 1.

Referring now to FIG. 4, there is depicted a time-space diagram of an exemplary operation on a local or system interconnect 110, 114 of data processing system 100 of FIG. 1. The operation begins when a master 232 of an L2 cache 230 (or another master, such as an I/O controller 214) issues a request 402 on a local interconnect 114 and/or system interconnect 110. Request 402 preferably includes a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique cached copy of a memory block without regard to its present state and subsequently modify its contents; requires destruction of other copies, if any |
| DCBF (Data Cache Block Flush) | Requests authority to flush all copies of a memory block from all caches; causes any modified copy of the memory block to be written to system memory |
| CASTOUT | Copies the image of a memory block from a higher level of memory to a lower level of memory in preparation for the destruction of the higher level copy |
| KILL | Forces destruction of cached copies, if any, of a memory block not held in the cache hierarchy of the master |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Request 402 is received by the snooper 236 of L2 caches 230, as well as the snoopers 222 of memory controllers 206 (FIG. 1). In general, with some exceptions, the snooper 236 in the same L2 cache 230 as the master 232 of request 402 does not snoop request 402 (i.e., there is generally no self-snooping) because a request 402 is transmitted on local interconnect 114 and/or system interconnect 110 only if the request 402 cannot be serviced internally by a processing unit 104. Each snooper 222, 236 that receives request 402 may provide a respective partial response 406 representing the response of at least that snooper to request 402. A snooper 222 within a memory controller 206 determines the partial response 406 to provide based, for example, whether the snooper 222 is responsible for the request address and whether it has resources available to service the request. A snooper 236 of an L2 cache 230 may determine its partial response 406 based on, for example, the availability of its L2 cache directory 302, the availability of a snoop logic instance within snooper 236 to handle the request, and the coherency state associated with the request address in L2 cache directory 302.

The partial responses of snoopers 222 and 236 are logically combined either in stages or all at once by one or more instances of response logic 210 to determine a system-wide combined response (CR) 410 to request 402. Subject to the scope restrictions discussed below, response logic 210 provides combined response 410 to master 232 and snoopers 222, 236 via its local interconnect 114 and/or system interconnect 110 to indicate the system-wide response (e.g., success, failure, retry, etc.) to request 402. If CR 410 indicates success of request 402, CR 410 may indicate, for example, a data source for a requested memory block, a cache state in which the requested memory block is to be cached by master 232, and whether "cleanup" (e.g., KILL) operations invalidating the requested memory block in one or more L2 caches 230 are required.

In response to receipt of combined response 410, one or more of master 232 and snoopers 222, 236 typically perform one or more operations in order to service request 402. These operations may include supplying data to master 232, invalidating or otherwise updating the coherency state of data cached in one or more L2 caches 230, performing castout operations, writing back data to a system memory 108, etc. If required by request 402, a requested or target memory block may be transmitted to or from master 232 before or after the generation of combined response 410 by response logic 210.

In the following description, the partial response of a snooper 222, 236 to a request and the operations performed by the snooper in response to the request and/or its combined response will be described with reference to whether that snooper is a Highest Point of Coherency (HPC), a Lowest Point of Coherency (LPC), or neither with respect to the request address specified by the request. An LPC is defined herein as a memory device or I/O device that functions as the control point for the repository of a memory block. In the absence of a HPC for the memory block, the LPC controls access to the storage holding the true image of the memory block and has authority to grant or deny requests to generate an additional cached copy of the memory block. For a typical request in the data processing system embodiment of FIGS. 1 and 2, the LPC will be the memory controller 206 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIGS. 1 and 2, the HPC, if any, will be an L2 cache 230. Although other indicators may be utilized to designate an HPC for a memory block, a preferred embodiment of the present invention designates the HPC, if any, for a memory block utilizing selected cache coherency state(s) within the L2 cache directory 302 of an L2 cache 230, as described further below with reference to Table II.

Still referring to FIG. 4, the HPC, if any, for a memory block referenced in a request 402, or in the absence of an HPC, the LPC of the memory block, preferably has the responsibility of protecting the transfer of ownership of a memory block in response to a request 402 during a protection window 404a. In the exemplary scenario shown in FIG. 4, the snooper 236 that is the HPC for the memory block specified by the request address of request 402 protects the transfer of ownership of the requested memory block to master 232 during a protection window 404a that extends from the time that snooper 236 determines its partial response 406 until snooper 236 receives combined response 410. During protection window 404a, snooper 236 protects the transfer of ownership by providing partial responses 406 to other requests specifying the same request address that prevent other masters from obtaining ownership until ownership has been successfully transferred to master 232. Master 232 likewise initiates a protection window 404b to protect its ownership of the memory block requested in request 402 following receipt of combined response 410.

Because snoopers 222, 236 all have limited resources for handling the CPU and I/O requests described above, several different levels of partial responses and corresponding CRs are possible. For example, if a snooper 222 within a memory controller 206 that is responsible for a requested memory block has a queue available to handle a request, the snooper 222 may respond with a partial response indicating that it is able to serve as the LPC for the request. If, on the other hand, the snooper 222 has no queue available to handle the request, the snooper 222 may respond with a partial response indicating that is the LPC for the memory block, but is unable to currently service the request.

Similarly, a snooper 236 in an L2 cache 230 may require an available instance of snoop logic and access to L2 cache directory 302 in order to handle a request. Absence of access to either (or both) of these resources results in a partial response (and corresponding CR) signaling a present inability to service the request due to absence of a required resource.

Hereafter, a snooper 222, 236 providing a partial response indicating that the snooper has available all internal resources required to presently service a request, if required, is said to "affirm" the request. For snoopers 236, partial responses affirming a snooped operation preferably indicate the cache state of the requested or target memory block at that snooper 236. A snooper 222, 236 providing a partial response indicating that the snooper 236 does not have available all internal resources required to presently service the request may be said to be "possibly hidden" or "unable" to service the request. Such a snooper 236 is "possibly hidden" or "unable" to service a request because the snooper 236, due to lack of an available instance of snoop logic or present access to L2 cache directory 302, cannot "affirm" the request in sense defined above and has, from the perspective of other masters 232 and snoopers 222, 236, an unknown coherency state.

III. Data Delivery Domains

Conventional broadcast-based data processing systems handle both cache coherency and data delivery through broadcast communication, which in conventional systems is transmitted on a system interconnect to at least all memory controllers and cache hierarchies in the system. As compared with systems of alternative architectures and like scale, broadcast-based systems tend to offer decreased access latency and better data handling and coherency management of shared memory blocks.

As broadcast-based system scale in size, traffic volume on the system interconnect is multiplied, meaning that system cost rises sharply with system scale as more bandwidth is required for communication over the system interconnect. That is, a system with m processor cores, each having an average traffic volume of n transactions, has a traffic volume of m×n, meaning that traffic volume in broadcast-based systems scales multiplicatively not additively. Beyond the requirement for substantially greater interconnect bandwidth, an increase in system size has the secondary effect of increasing some access latencies. For example, the access latency of read data is limited, in the worst case, by the combined response latency of the furthest away lower level cache holding the requested memory block in a shared coherency state from which the requested data can be sourced.

In order to reduce system interconnect bandwidth requirements and access latencies while still retaining the advantages of a broadcast-based system, multiple L2 caches 230 distributed throughout data processing system 100 are permitted to hold copies of the same memory block in a "special" shared coherency state that permits these caches to supply the memory block to requesting L2 caches 230 using cache-to-cache intervention. In order to implement multiple concurrent and distributed sources for shared memory blocks in an SMP data processing system, such as data processing system 100, two issues must be addressed. First, some rule governing the creation of copies of memory blocks in the "special" shared coherency state alluded to above must be implemented. Second, there must be a rule governing which snooping L2 cache 230, if any, provides a shared memory block to a requesting L2 cache 230, for example, in response to a bus read operation or bus RWITM operation.

According to the present invention, both of these issues are addressed through the implementation of data sourcing domains. In particular, each domain within a SMP data processing system, where a domain is defined to include one or more lower level (e.g., L2) caches that participate in responding to data requests, is permitted to include only one cache hierarchy that holds a particular memory block in the "special" shared coherency state at a time. That cache hierarchy, if present when a bus read-type (e.g., read or RWITM) operation is initiated by a requesting lower level cache in the same domain, is responsible for sourcing the requested memory block to the requesting lower level cache. Although many different domain sizes may be defined, in data processing system 100 of FIG. 1, it is convenient if each processing node 102 (i.e., MCM) is considered a data sourcing domain. One example of such a "special" shared state (i.e., Sr) is described below with reference to Table II.

IV. Coherency Domains

While the implementation of data delivery domains as described above improves data access latency, this enhancement does not address the m×n multiplication of traffic volume as system scale increases. In order to reduce traffic volume while still maintaining a broadcast-based coherency mechanism, preferred embodiments of the present invention additionally implement coherency domains, which like the data delivery domains hereinbefore described, can conveniently (but are not required to be) implemented with each processing node 102 forming a separate coherency domain. Data delivery domains and coherency domains can be, but are not required to be coextensive, and for the purposes of explaining exemplary operation of data processing system 100 will hereafter be assumed to have boundaries defined by processing nodes 102.

The implementation of coherency domains reduces system traffic by limiting inter-domain broadcast communication over system interconnect 110 in cases in which requests can be serviced with participation by fewer than all coherency domains. For example, if processing unit 104a of processing node 102a has a bus read operation to issue, then processing unit 104a may elect to first broadcast the bus read operation to all participants within its own coherency domain (e.g., processing node 102a), but not to participants in other coherency domains (e.g., processing node 102b). A broadcast operation transmitted to only those participants within the same coherency domain as the master of the operation is defined herein as a "local operation". If the local bus read operation can be serviced within the coherency domain of processing unit 104a, then no further broadcast of the bus read operation is performed. If, however, the partial responses and combined response to the local bus read operation indicate that the bus read operation cannot be serviced solely within the coherency domain of processing node 102a, the scope of the broadcast may then be extended to include, in addition to the local coherency domain, one or more additional coherency domains.

In a basic implementation, two broadcast scopes are employed: a "local" scope including only the local coherency domain and a "global" scope including all of the other coherency domains in the SMP data processing system. Thus, an operation that is transmitted to all coherency domains in an SMP data processing system is defined herein as a "global operation". Importantly, regardless of whether local operations or operations of more expansive scope (e.g., global operations) are employed to service operations, cache coherency is maintained across all coherency domains in the SMP data processing system. Examples of local and global operations are described in detail in U.S. patent application Ser. No. 11/055,305, which is incorporated herein by reference in its entirety.

In a preferred embodiment, the scope of an operation is indicated in a bus operation by a local/global scope indicator (signal), which in one embodiment may comprise a 1-bit flag. Forwarding logic 212 within processing units 104 preferably determines whether or not to forward an operation, received via local interconnect 114 onto system interconnect 110 based upon the setting of the local/global scope indicator (signal) in the operation.

In the present description, a coherency domain is referred to the "home" coherency domain (or "home" node) of a memory block if the coherency domain (or processing node) contains the LPC of the memory block.

V. Domain Indicators

Figure 5:
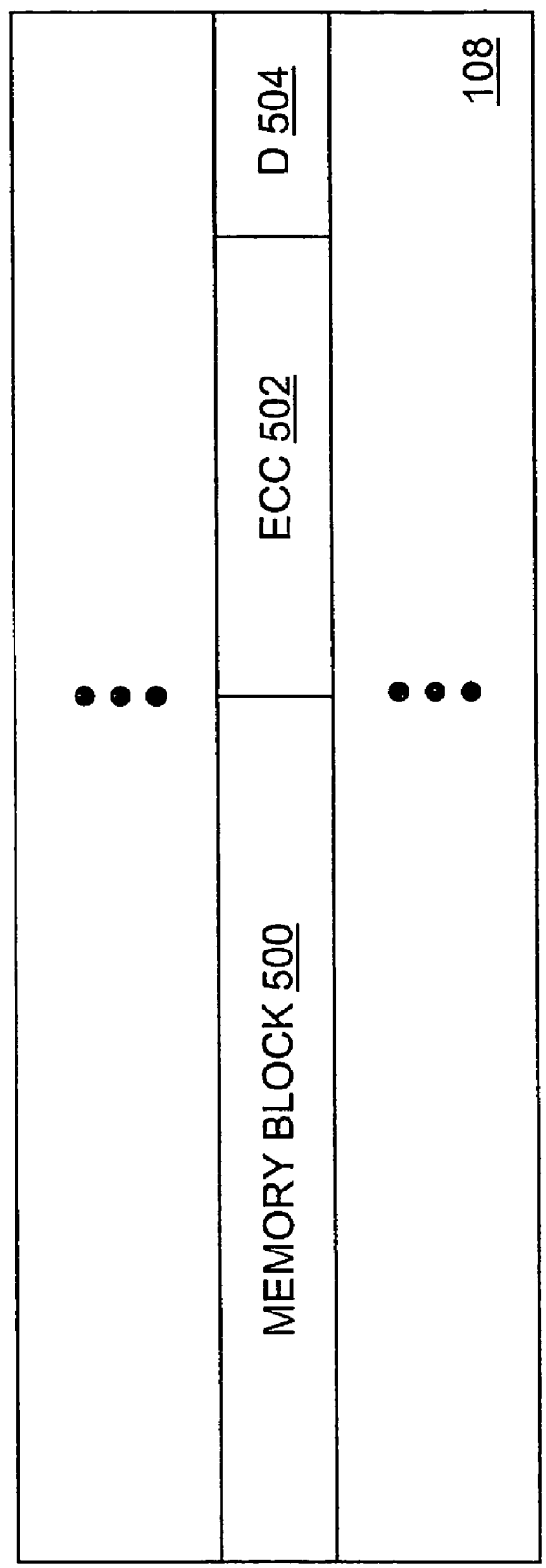
FIG. 5 illustrates a domain indicator in accordance with a preferred embodiment of the present invention.

In order to limit the issuance of unneeded local operations and thereby reduce operational latency and conserve additional bandwidth on local interconnects, the present invention preferably implements a domain indicator per memory block that indicates whether or not a copy of the associated memory block is cached outside of the local coherency domain. For example, FIG. 5 depicts a first exemplary implementation of a domain indicator in accordance with the present invention. As shown in FIG. 5, a system memory 108, which may be implemented in dynamic random access memory (DRAM), stores a plurality of memory blocks 500. System memory 108 stores in association with each memory block 500 an associated error correcting code (ECC) 502 utilized to correct errors, if any, in memory block 500 and a domain indicator 504. Although in some embodiments of the present invention, domain indicator 504 may identify a particular coherency domain (i.e., specify a coherency domain or node ID), it is hereafter assumed that domain indicator 504 is a 1-bit indicator that is set (e.g., to '1' to indicate "local") if the associated memory block 500 is cached, if at all, only within the same coherency domain as the memory controller 206 serving as the LPC for the memory block 500. Domain indicator 504 is reset (e.g., to '0' to indicate "global") otherwise. The setting of domain indicators 504 to indicate "local" may be implemented imprecisely in that a false setting of "global" will not induce any coherency errors, but may cause unneeded global broadcasts of operations.

Memory controllers 206 (and L2 caches 230) that source a memory block in response to an operation preferably transmit the associated domain indicator 504 in conjunction with the requested memory block.

VI. Exemplary Coherency Protocol

The present invention preferably implements a cache coherency protocol designed to leverage the implementation of data delivery and coherency domains as described above. In a preferred embodiment, the cache coherency states within the protocol, in addition to providing (1) an indication of whether a cache is the HPC for a memory block, also indicate (2) whether the cached copy is unique (i.e., is the only cached copy system-wide) among caches at that memory hierarchy level, (3) whether and when the cache can provide a copy of the memory block to a master of a request for the memory block, (4) whether the cached image of the memory block is consistent with the corresponding memory block at the LPC (system memory), and (5) whether another cache in a remote coherency domain (possibly) holds a cache entry having a matching address. These five attributes can be expressed, for example, in an exemplary variant of the well-known MESI (Modified, Exclusive, Shared, Invalid) protocol summarized below in Table II.

TABLE II

| Cache state | HPC? | Unique? | Data source? | Consistent with LPC? | Cached outside local domain? | Legal concurrent states |
|---|---|---|---|---|---|---|
| M | yes | yes | yes, before CR | no | no | I, Ig, Igp, In (& LPC) |
| Me | yes | yes | yes, before CR | yes | no | I, Ig, Igp, In (& LPC) |

TABLE II-continued

| Cache state | HPC? | Unique? | Data source? | Consistent with LPC? | Cached outside local domain? | Legal concurrent states |
|---|---|---|---|---|---|---|
| T | yes | unknown | yes, after CR if none provided before CR | no | unknown | Sr, S, I, Ig, Igp, In (&LPC) |
| Tn | yes | unknown | yes, after CR if none provided before CR | no | no | Sr, S, I, Ig, Igp, In (&LPC) |
| Te | yes | unknown | yes, after CR if none provided before CR | yes | unknown | Sr, S, I, Ig, Igp, In (&LPC) |
| Ten | yes | unknown | yes, after CR if none provided before CR | yes | no | Sr, S, I, Ig, Igp, In (&LPC) |
| Sr | no | unknown | yes, before CR | unknown | unknown | T, Tn, Te, Ten, S, I, Ig, Igp, In (&LPC) |
| S | no | unknown | no | unknown | unknown | T, Tn, Te, Ten, Sr, S, I, Ig, Igp, In (&LPC) |
| I | no | n/a | no | n/a | unknown | M, Me, T, Tn, Te, Ten, Sr, S, I, Ig, Igp, In (& LPC) |
| Ig | no | n/a | no | n/a | Assumed so, in absence of other information | M, Me, T, Tn, Te, Ten, Sr, S, I, Ig, Igp, In (& LPC) |
| Igp | no | n/a | no | n/a | Assumed so, in absence of other information | M, Me, T, Tn, Te, Ten, Sr, S, I, Ig, Igp, In (& LPC) |
| In | no | n/a | no | n/a | Assumed not, in absence of other information | M, Me, T, Tn, Te, Ten, Sr, S, I, Ig, Igp, In (& LPC) |

A. Ig State

In order to avoid having to access the LPC to determine whether or not the memory block is known to be cached, if at all, only locally, the Ig (Invalid global) coherency state is utilized to maintain a domain indication in cases in which no copy of a memory block remains cached in a coherency domain. The Ig state is defined herein as a cache coherency state indicating (1) the associated memory block in the cache array is invalid, (2) the address tag in the cache directory is valid, and (3) a copy of the memory block identified by the address tag may possibly be cached in a coherency domain other than the home coherency domain. The Ig indication is preferably imprecise, meaning that it may be incorrect without a violation of coherency.

The Ig state is formed in a lower level cache in the home coherency domain in response to that cache providing a requested memory block to a requestor in another coherency domain in response to an exclusive access request (e.g., a bus RWITM operation).

Because cache directory entries including an Ig state carry potentially useful information, it is desirable in at least some implementations to preferentially retain entries in the Ig state over entries in the I state (e.g., by modifying the Least Recently Used (LRU) algorithm utilized to select a victim cache entry for replacement). As Ig directory entries are retained in cache, it is possible for some Ig entries to become "stale" over time in that a cache whose exclusive access request caused the formation of the Ig state may deallocate or writeback its copy of the memory block without notification to the cache holding the address tag of the memory block in the Ig state. In such cases, the "stale" Ig state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Ig cache entries.

Several rules govern the selection and replacement of Ig cache entries. First, if a cache selects an Ig entry as the victim for replacement, a castout of the Ig entry is performed (unlike the case when an I, In or Igp entry is selected) in order to update the corresponding domain indicator 504 in system memory 108. Second, if a request that causes a memory block to be loaded into a cache hits on an Ig cache entry in that same cache, the cache treats the Ig hit as a cache miss and performs a castout operation with the Ig entry as the selected victim. The cache thus avoids avoid placing two copies of the same address tag in the cache directory. Third, the castout of the Ig state is preferably performed as a local-only operation limited in scope to the local coherency domain. Fourth, the castout of the Ig state is preferably performed as a dataless address-only operation in which the domain indication is written back to the domain indicator 504 in the LPC.

Implementation of an Ig state in accordance with the present invention improves communication efficiency by maintaining a cached domain indicator for a memory block in a home coherency domain even when no valid copy of the memory block remains cached in the home coherency domain. As described below, the cache domain indication provided by the Ig state can be utilized to predict a global broadcast scope on the interconnect fabric for operations targeting the associated memory block.

B. Igp State

The Igp (Invalid global predict-only) coherency state is utilized to maintain a cached domain indication in cases in which no copy of a memory block remains cached in a non-home coherency domain. The Igp state is defined herein as a cache coherency state indicating (1) the associated memory block in the cache array is invalid, (2) the address tag in the cache directory is valid, (3) the present coherency domain is not the home coherency domain, and (4) a copy of the memory block identified by the address tag may possibly be cached in a coherency domain other than the present non-home coherency domain. Although precisely formed, the Igp indication is preferably imprecisely maintained, meaning that it may be incorrect without a violation of coherency.

The Igp state is formed in a lower level cache in a non-home coherency domain in response to that cache providing coherency ownership of a requested memory block to a requestor in another coherency domain in response to an exclusive access request (e.g., a RWITM, DClaim, DCBZ, Kill, Write or Partial Write request).

Because cache directory entries including an Igp state carry potentially useful information, it is desirable in at least some implementations to preferentially retain entries in the Ig state over entries, if any, in the I state (e.g., by modifying the Least Recently Used (LRU) algorithm utilized to select a victim cache entry for replacement). As Igp directory entries are retained in cache, it is possible for some Igp entries to become "stale" over time in that a copy of the memory block may return to the coherency domain without snooping by the cache holding the address tag of the memory block in the Igp state. In such cases, the "stale" Igp state, which incorrectly indicates that a global operation should be issued instead of a local operation, will not cause any coherency errors, but will merely cause some operations, which could otherwise be serviced utilizing a local operation, to be issued as global operations. Occurrences of such inefficiencies will be limited in duration by the eventual replacement of the "stale" Igp cache entries.

In contrast to the handling of Ig entries, no castout of Igp entries is performed in response to selection of an Igp entry as the victim for replacement, for example, in accordance with a replacement algorithm (e.g., LRU) or because a request that causes a memory block to be loaded into a cache hits on an Igp cache entry in that same cache. Instead, the Igp entry is simply deallocated. No castout is performed because Igp entries do not maintain a cached and possibly modified copy of the underlying domain indicators 504.

Implementation of an Igp state in accordance with the present invention improves communication efficiency by maintaining a cached domain indicator for a memory block in a non-home coherency domain for scope prediction purposes even when no valid copy of the memory block remains cached in the non-home coherency domain.

C. In State

The In state is defined herein as a cache coherency state indicating (1) the associated memory block in the cache array is invalid, (2) the address tag in the cache directory is valid, and (3) a copy of the memory block identified by the address tag is likely cached, if at all, only by one or more other cache hierarchies within the local coherency domain. The In indication is preferably imprecise, meaning that it may be incorrect without a violation of coherency. The In state is formed in a lower level cache in response to that cache providing a requested memory block to a requestor in the same coherency domain in response to an exclusive access request (e.g., a bus RWITM operation).

Because cache directory entries including an In state carry potentially useful information, it is desirable in at least some implementations to preferentially retain entries in the In state over entries in the I state (e.g., by modifying the Least Recently Used (LRU) algorithm utilized to select a victim cache entry for replacement). As In directory entries are retained in cache, it is possible for some In entries to become "stale" over time in that a cache whose exclusive access request caused the formation of the In state may itself supply a shared copy of the memory block to a remote coherency domain without notification to the cache holding the address tag of the memory block in the In state. In such cases, the "stale" In state, which incorrectly indicates that a local operation should be issued instead of a global operation, will not cause any coherency errors, but will merely cause some operations to be erroneously first issued as local operations, rather than as global operations. Occurrences of such inefficiencies will be limited in duration by the eventual replacement of the "stale" In cache entries. In a preferred embodiment, cache entries in the In coherency state are not subject to castout, but are instead simply replaced. Thus, unlike Ig cache entries, In cache entries are not utilized to update domain indicators 504 in system memories 108.

Implementation of an In state in accordance with the present invention improves communication efficiency by maintaining a cached domain indicator for a memory block that may be consulted by a master in order to select a local scope for one of its operations. As a consequence, bandwidth on system interconnect 110 and local interconnects 114 in other coherency domains is conserved.

D. Sr State

In the operations described below, it is useful to be able to determine whether or not a lower level cache holding a shared requested memory block in the Sr coherency state is located within the same domain as the requesting master. In one embodiment, the presence of a "local" Sr snooper within the same domain as the requesting master can be indicated by the response behavior of a snooper at a lower level cache holding a requested memory block in the Sr coherency state. For example, assuming that each bus operation includes a range indicator indicating whether the bus operation has crossed a domain boundary (e.g., an explicit domain identifier of the master or a single local/not local range bit), a lower level cache holding a shared memory block in the Sr coherency state can provide a partial response affirming the request in the Sr state only for requests by masters within the same data sourcing domain and provide partial responses indicating the S state for all other requests. In such embodiments the response behavior can be summarized as shown in Table III, where prime (') notation is utilized to designate partial responses that may differ from the actual cache state of the memory block.

TABLE III

| Domain of master of read-type request | Cache state in directory | Partial response (adequate resources available) | Partial response (adequate resources unavailable) |
| --- | --- | --- | --- |
| "local" (i.e., within same domain) | Sr | Sr' affirm | Sr' possibly hidden |
| "remote" (i.e., not within same domain) | Sr | S' affirm | S' possibly hidden |

TABLE III-continued

| Domain of master of read-type request | Cache state in directory | Partial response (adequate resources available) | Partial response (adequate resources unavailable) |
|---|---|---|---|
| "local" (i.e., within same domain) | S | S' affirm | S' possibly hidden |
| "remote" (i.e., not within same domain) | S | S' affirm | S' possibly hidden |

Assuming the response behavior set forth above in Table III, the average data latency for shared data can be significantly decreased by increasing the number of shared copies of memory blocks distributed within an SMP data processing system that may serve as data sources.

VII. Exemplary Data Cache Block Flush Operation

Figure 6A:
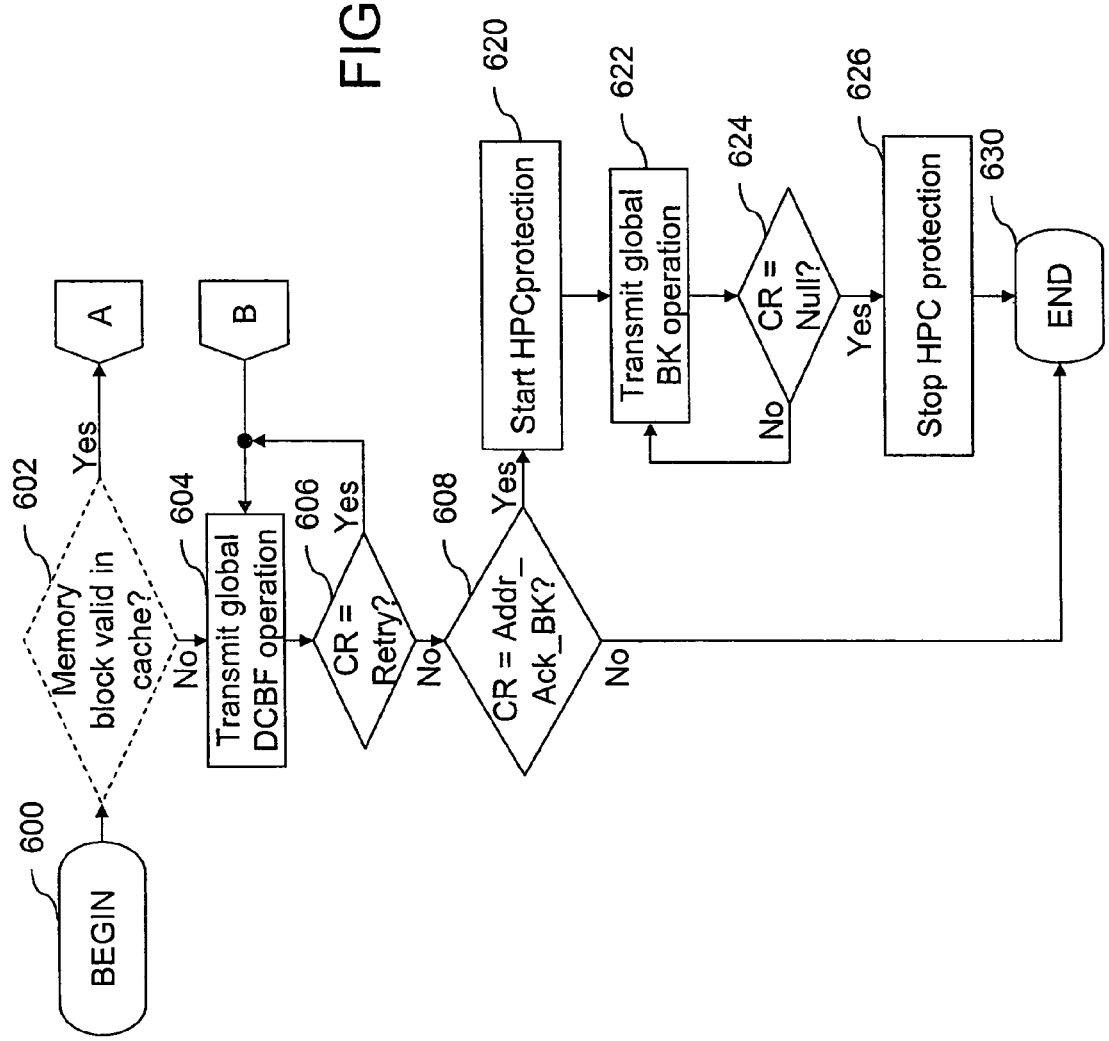
FIGS. 6A-6B together form a high level logical flowchart of an exemplary method by which a cache memory services a data cache block flush (DCBF) operation received from a processor core in a data processing system in accordance with the present invention.
Figure 6B:
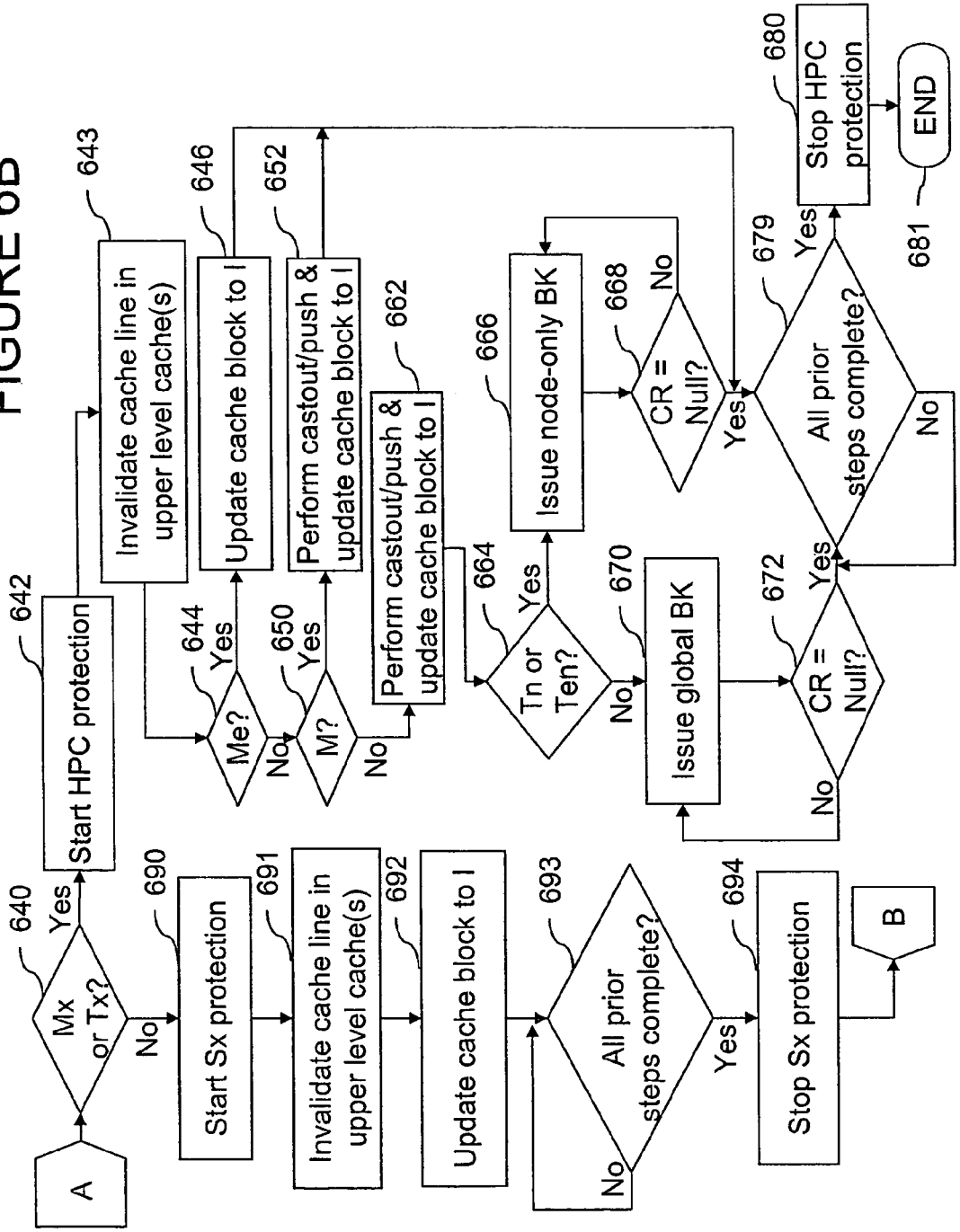

With reference now to FIGS. 6A-6B, there is depicted a high level logical flowchart of an exemplary method by which a cache memory services a data cache block flush (DCBF) operation received from an associated processor core in accordance with the present invention. As with the other logical flowcharts presented herein, at least some of the steps depicted in FIGS. 6A-6B may be performed in a different order than is shown or may be performed concurrently.

The process of FIG. 6A begins at block 600, which represents a master 232 in an L2 cache 230 receiving a CPU DCBF request from an associated processor core 200 in its processing unit 104. The CPU DCBF request specifies a target memory block to be flushed from cache memory to system memory. In different embodiments, master 232 may be designed to handle the CPU DCBF request with or without self-snooping. If master 232 is designed to self-snoop the address specified in the CPU DCBF request against its L2 cache directory 302, the process next proceeds to block 602, which is described below. If, however, master 232 is not designed to self-snoop the address specified in the CPU DCBF request, the process proceeds directly from block 600 to block 604.

At block 604, master 232 transmits a global DCBF request to all processing units 104 within data processing system 100 via its local interconnect 114 and system interconnect 110. In general, the global DCBF request includes at least a transaction type (Ttype) identifying the request as a global DCBF request and a target address identifying a target memory block to be flushed by the global DCBF operation. Master 232 thereafter awaits receipt of the combined response (CR) for the global DCBF request to determine whether any further action (e.g., a background kill (BK) operation invalidating remaining cached copies of the target memory block) is required in order to complete the global DCBF operation. As shown at block 606, if the combined response for the global DCBF request is a Retry, the process returns to block 604, representing master 232 reissuing the global DCBF request. If the combined response is not Retry but is instead Addr_Ack_BK (Address Acknowledge Background Kill) (block 608), the process proceeds to block 620, which is described below. An Addr_Ack_BK combined response indicates that a point of coherency was reached by the DCBF request, but a background kill operation is required in order to invalidate cached copies of the target memory block still remaining in data processing system 100. If master 232 determines at blocks 606 and 608 that the combined response is not Retry or Addr_Ack_BK, then the global DCBF operation has completed successfully, and the process ends at block 630.

Referring now to block 620, in response to receipt of an Addr_Ack_BK combined response, master 232, which may or may not have been the HPC for the target memory block when the global DCBF request was issued, assumes HPC status with respect to the target memory block and begins HPC protection of the target address. HPC protection of the target address entails master 232 preventing other operations that request access to the target memory block from succeeding by providing a Retry_other partial response. In addition, as shown at block 622, master 232 transmits to all processing units 104 in data processing system 100 a global background kill (BK) request specifying the address of the target memory block in order to force the invalidation of all cached copies of the target memory block still remaining within data processing system 100. Master 232 then awaits the combined response for the global background kill request at block 624. If the combined response is not Null, meaning that at least one cached copy of the target memory block may still remain in data processing system 100, the process returns to block 622, and master 232 reissues the global background kill request. If, on the other hand, the combined response for the global background kill request is Null, meaning that no cached copies of the target memory block remain in data processing system 100, the process proceeds to block 626. At block 626, master 232 ends HPC protection of the target memory block. Thereafter, the process depicted in FIG. 6A ends at block 630.

Returning now to block 602, in implementations in which master 232 is designed to self-snoop the target address specified in the CPU DCBF request against its L2 cache directory 302, master 232 accesses L2 cache directory 302 to determine whether or not the target memory block of the CPU DCBF request has a data-valid coherency state (e.g., M, Me, T, Te, Tn, Ten, S, or Sr) in L2 cache directory 302. If not, the process passes to block 604 and following blocks, which have been described. If, however, L2 cache directory 302 indicates that the target memory block has a data-valid coherency state in L2 cache directory 302, the process passes through connector A to block 640 of FIG. 6B.

At block 640, master 232 determines whether the coherency state of the target memory block in L2 cache directory 302 indicates that master 232 is located at the HPC for the target memory block, that is, master 232 determines whether the coherency state is Mx (e.g., M or Me) or Tx (e.g., T, Te, Tn or Ten). If master 232 determines at block 640 that it is not located at the HPC for the target memory block, the process passes to block 690, which illustrates master 232 beginning Sx protection for the target memory block. Sx protection entails master 232 providing a Retry_shared partial response to requests for the target memory block. Master 232 then invalidates the target memory block in its associated upper level cache(s) (e.g., L1 caches 226), as shown at block 691, and updates the coherency state of the target memory block to I within L2 cache directory 302 (block 692). As indicated at blocks 693 and 694, master 232 thereafter ends Sx protection for the target memory block after the operations depicted at blocks 691-692 are complete. Thereafter, the process passes through page connector B to block 604 of FIG. 6A, which has been described.

Returning to block 640, in response to a determination that the coherency state of the target memory block in L2 cache directory 302 indicates that master 232 is located at the HPC for the target memory block, the process passes to blocks 642-643. Blocks 642 and 643 respectively illustrate master 232 beginning HPC protection for the target memory block and thereafter invalidating the target memory block in its associated upper level caches(s) (e.g., L1 caches 226). Master 232 also handles the CPU DCBF request in accordance with its coherency state with respect to the target memory block. For example, if master 232 determines that the target memory block has a Me coherency state in L2 cache directory 302 (block 644), meaning that the cached memory block is consistent with system memory 108, no flush to system memory 108 is required. Consequently, to service the CPU DCBF request, master 232 simply updates the coherency of the target memory block to I within L2 cache directory 302, as shown at block 646.

Referring now to block 650, if master 232 instead determines that the target memory block has a M coherency state in L2 cache directory 302, master 232 performs a castout-push of the target memory block to update system memory 108 with the most recent copy of the memory block and then updates the coherency state of the target memory block to I within L2 cache directory 302 (block 652).

Referring again to block 650, in response to a determination that the coherency state of the target memory block within L2 cache directory 302 is not M, meaning that the coherency state must be Tx (e.g., T, Te, Tn or Ten), the process proceeds to block 662. Block 662 illustrates master 232 performing a castout-push of the target memory block to update system memory 108 with the most recent copy of the memory block and then updating the coherency state of the target memory block to I within L2 cache directory 302. Next, as indicated at block 664, master 232 determines the scope of a background kill operation to be issued on the interconnect fabric by reference to the coherency state of the memory block in L2 cache directory 302.

If the coherency state is Tn or Ten, meaning that the target memory block is cached, if anywhere, only within the same coherency domain (e.g., processing node 102) as master 232, a global background kill operation is unnecessary. Consequently, master 232 broadcasts a local background kill request on its local interconnect 114 having a scope limited to the local processing node 102, as depicted at block 666. As indicated at block 668, master 232 continues to reissue the local background kill request until a Null combined response is received.

Referring again to block 664, if the coherency state of the target memory block in L2 cache directory 302 is T or Te, the target memory block is possibly cached outside of the local coherency domain. Accordingly, master 232 issues a global background kill request on its local interconnect 114 having a scope that includes all processing nodes 102, as depicted at block 670. As indicated at block 672, master 232 continues to reissue the global background kill request until a Null combined response is received.

Following any of blocks 646, 652, 672 and 668, the process proceeds to blocks 679 and 680, which depicts master 232 ending HPC protection of the target memory block after all preceding steps have completed. Thereafter, the process passes ends at block 681 of FIG. 6B.

Figure 7A:
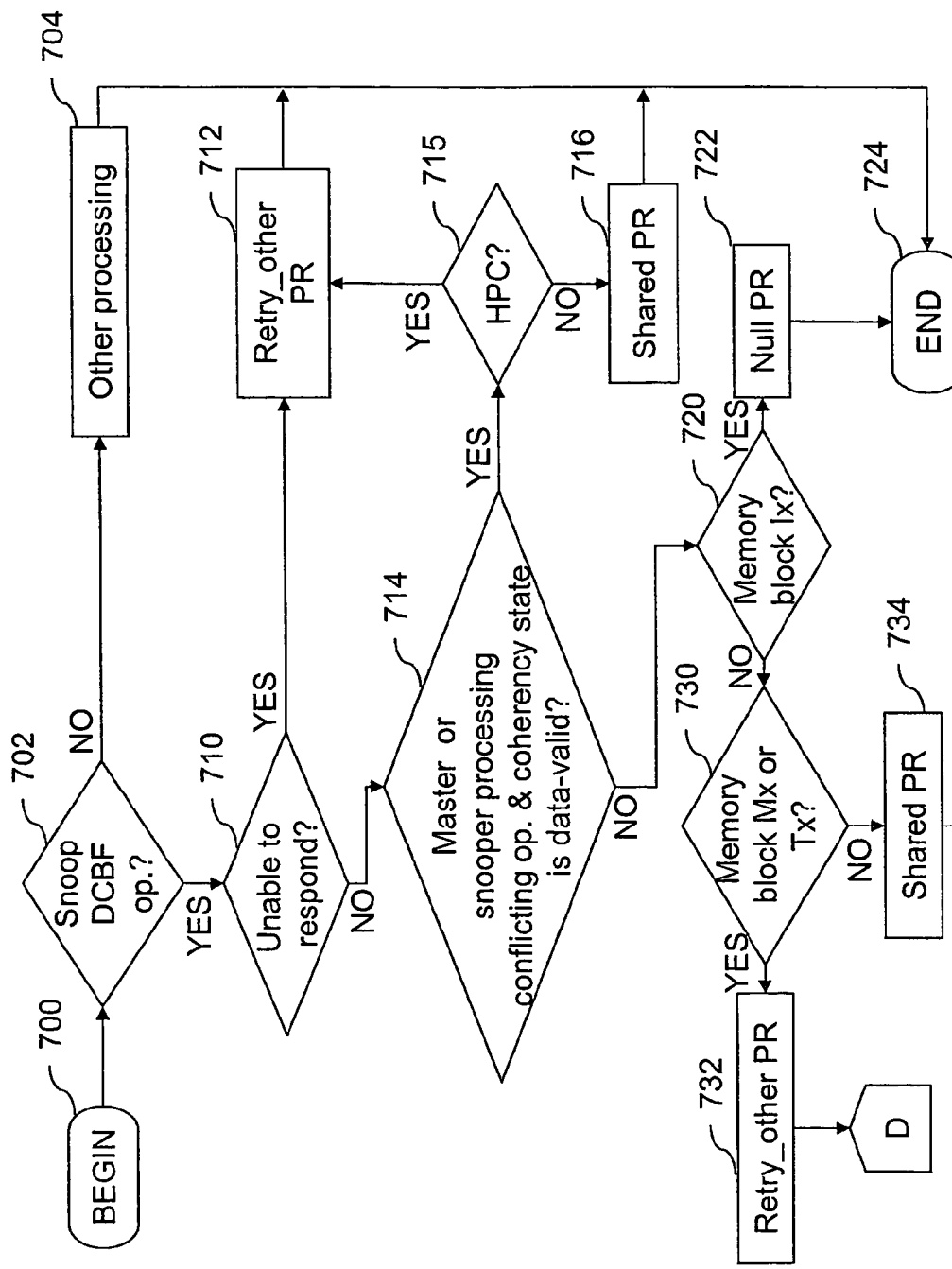
FIGS. 7A-7B together form a high level logical flowchart of an exemplary method by which a cache snooper processes a DCBF operation in accordance with the present invention.
Figure 7B:
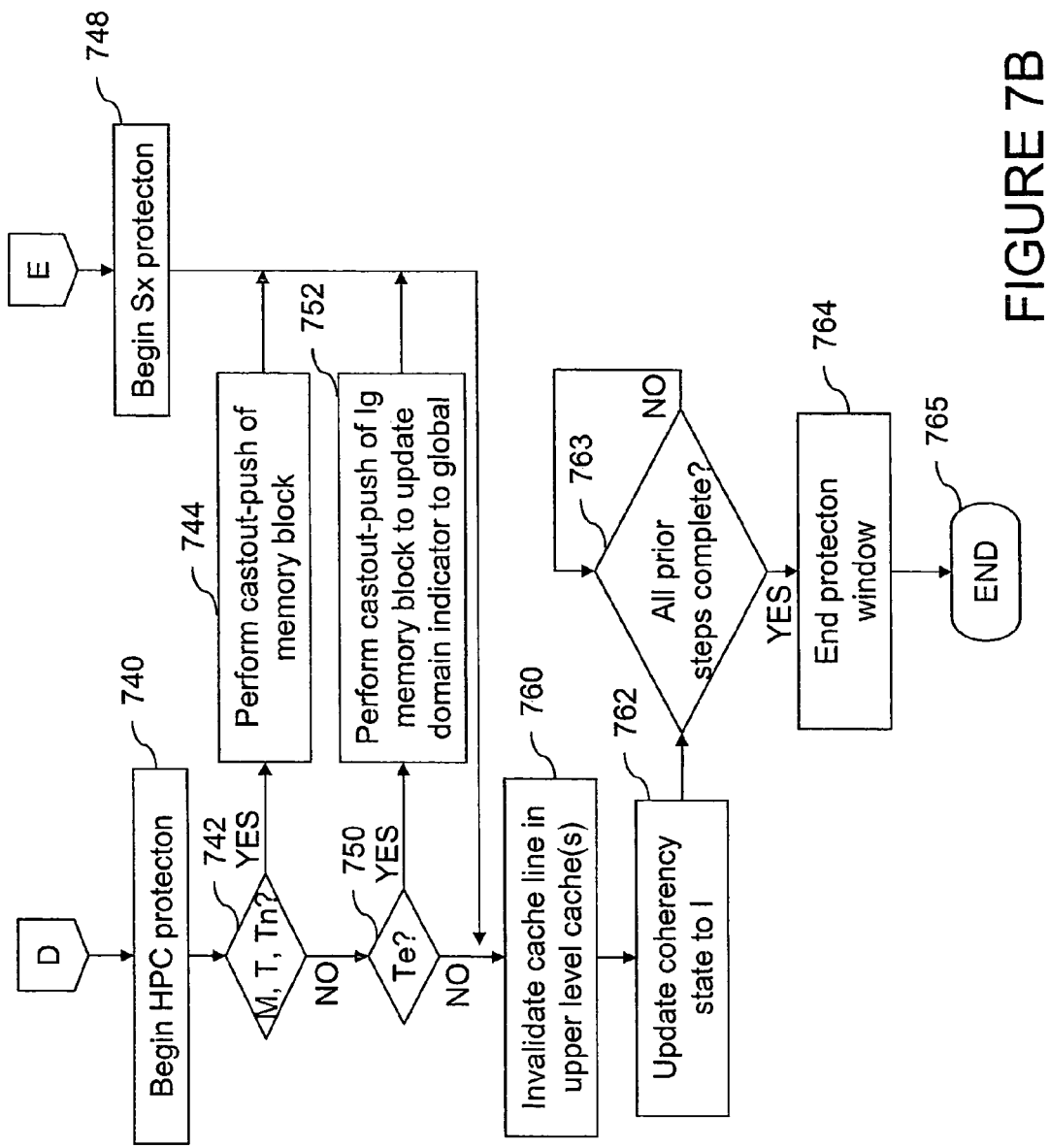

With reference now to FIGS. 7A-7B, there is depicted a high level logical flowchart of an exemplary method by which a cache snooper, such as an L2 cache snooper 236, processes a global DCBF request in accordance with the present invention. As shown, the process begins at block 700 of FIG. 7A in response to receipt by an L2 cache snooper 236 of a request on its local interconnect 114. In response to receipt of the request, snooper 236 determines at block 702 whether or not the request is a DCBF request, for example, by reference to a transaction type (Ttype) field within the request. If not, snooper 236 performs other processing, as shown at block 704, and the process ends at block 724. If, however, snooper 236 determines at block 702 that the request is a DCBF request, snooper 236 further determines at block 710 whether or not it is presently able to substantively respond to the DCBF request (e.g., whether it has an available instance of snoop logic and current access to L2 cache directory 302). If snooper 236 is presently unable to substantively respond to the domain query request, snooper 236 provides a partial response (PR) of Retry_other, as depicted at block 712, and processing of the DCBF request by snooper 236 ends at block 724.

Assuming that snooper 236 is able to substantively respond to the DCBF request, snooper 236 determines at block 714 whether or not the local master 232 or an instance of snoop logic within snooper 236 is currently processing a conflicting operation targeting the same memory address as the DCBF request and if the local master 232 or snoop logic instance indicates the target memory block has a data-valid coherency state (e.g., Mx, Tx, Sr or S). If snooper 236 determines at block 714 that local master 232 or an instance of snoop logic within snooper 236 is currently processing a conflicting operation targeting the same memory address as the DCBF request and that the memory block has a data-valid coherency state for the target memory block, snooper 236 provides a partial response dependent upon the indicated coherency state of the target memory block (block 715). That is, if the local master 232 or snoop logic instance indicates that the coherency state of the target memory block is Mx or Tx, snooper 236 provides a Retry_other partial response (block 712) and otherwise provides a Shared partial response (block 716). Following either block 712 or 716, the processing of the DCBF request by snooper 236 ends at block 724.

If, however, snooper 236 makes a negative determination at block 714, the process passes to blocks 720 and 730, which depict snooper 236 determining the coherency state for the target memory block in its L2 cache directory 302. If the coherency state is Ix (e.g., I, In, Ig, Igp), snooper 236 provides a Null partial response (block 722) indicating its L2 cache 230 does not hold a copy of the target memory block (and consequently the DCBF request has no effect on this L2 cache 230). Thereafter, the process ends at block 724. If, however, the coherency state is Mx or Tx, snooper 236 provides a Retry_other partial response (block 732) to force the DCBF request to be reissued until snooper 236 can push its copy of the target memory block to system memory 108. Alternatively, if the coherency state is Sx (e.g., S or Sr), snooper 236 provides a Shared partial response to the DCBF request (block 734). Following block 732 and block 734, the process passes to FIG. 7B through page connector D and page connector E, respectively.

Referring now to FIG. 7B, the castout and protection activities, if any, of snooper 236 are depicted. As illustrated, if snooper 236 has determined that the coherency state of the target memory block is Sx in its L2 cache directory 302, the process proceeds from page connector E to block 748, which depicts snooper 236 beginning Sx protection of the target address, meaning that snooper 236 thereafter provides a Retry_shared partial response in response to snooping operations targeting the same target memory address. Following block 748, the process proceeds to block 760, which is described below.

If, on the other hand, snooper 236 has determined that the coherency state for the target memory block in its L2 cache directory 302 is Mx or Tx, the process shown in FIG. 7B begins at page connector D and thereafter proceeds to blocks 740, which depicts snooper 236 starting HPC protection for the target memory block, meaning that snooper 236 thereafter provides a Retry_other partial response to snooped operations targeting the same target memory address. In addition, snooper 236 performs a castout-push in accordance with the coherency state of the target memory block in its L2 cache directory 302. As indicated at blocks 742 and 744, if snooper 236 has determined that the coherency state of the target memory block is M, T or Tn, snooper 236 updates system memory 108 with the latest data by performing a castout-push of the target memory block. On the other hand, if snooper 236 has determined that the coherency state of the target memory block is Te (block 750), meaning that a memory-consistent copy of the target memory block is possibly cached outside of the local coherency domain, snooper 236 need only update the domain indicator 504 to indicate "global." As indicated at block 752, this update can be performed by performing a dataless castout-push of the domain indicator as if the memory block were cached in the Ig coherency state. Alternatively, domain indicator 504 can be updated by performing a conventional castout-push as shown at block 744. Following block 744 or block 752, the process passes to block 760.

Block 760 depicts snooper 236 issuing a back-invalidation signal to invalidate the target memory block of the DCBF operation in the upper level cache(s) (e.g., L1 caches 226). In addition, as shown at block 762, snooper 236 invalidates the target memory block in L2 cache 230 by updating the relevant entry in L2 cache directory 302 to the I coherency state. As indicated at blocks 763 and 764, snooper 236 then ends its HPC or Sx protection window for the target memory block after the operations depicted at blocks 760 and 762 have fully completed. Following block 764, the process terminates at block 765 of FIG. 7B.

Figure 8A:
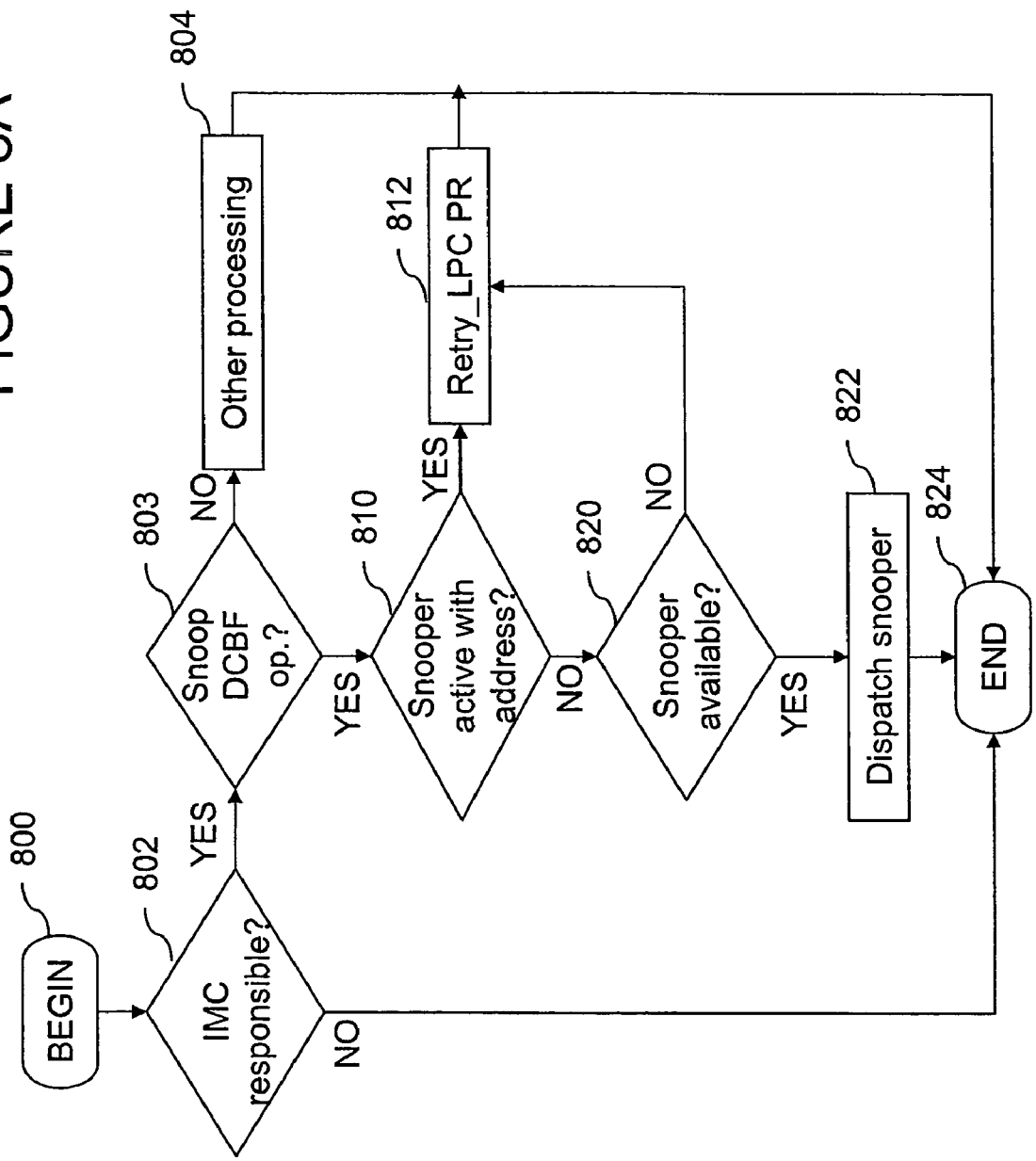
FIG. 8A is a high level logical flowchart of a process by which a memory controller determines whether or not to dispatch a memory controller snooper in response to receipt of a DCBF operation in accordance with the present invention.

With reference now to FIG. 8A, there is illustrated a high level logical flowchart of a process by which a memory controller (e.g., IMC 206) determines whether or not to dispatch a snooper 222 in response to receipt of a global DCBF request. As shown, the process begins at block 800 in response to receipt by an IMC 206 of a request via its local interconnect 114. IMC 206 then determines at block 802 by reference to BAR logic 240 whether or not it is responsible for the target address specified within the snooped operation. If not, the process passes to block 824 and ends. If, however, IMC 206 is responsible for the address specified within the snooped request, the process proceeds to block 803, which illustrates IMC 206 determining by reference to the Ttype of the operation if the snooped request is a global DCBF request. If not, IMC 206 performs other processing as shown at block 804, and the process terminates at block 824.

In response to IMC 206 determining at block 802 that the snooped request is a global DCBF operation, the process passes to block 810, which depicts IMC 206 determining whether or not a snooper 222 is currently active with respect to the target address specified within the global DCBF request. If so, IMC 206 provides a Retry_LPC partial response to the global DCBF request, as depicted at block 812. As indicated at blocks 820 and 812, IMC 206 similarly provides a Retry_LPC partial response to the global DCBF request if no snooper 222 is available for dispatch. However, in response to a determination at block 820 that a snooper 222 is available for dispatch, IMC 206 dispatches a snooper 222 to handle the global DCBF request, as illustrated at block 822. Thereafter, the process shown in FIG. 8A terminates at block 824.

Figure 8B:
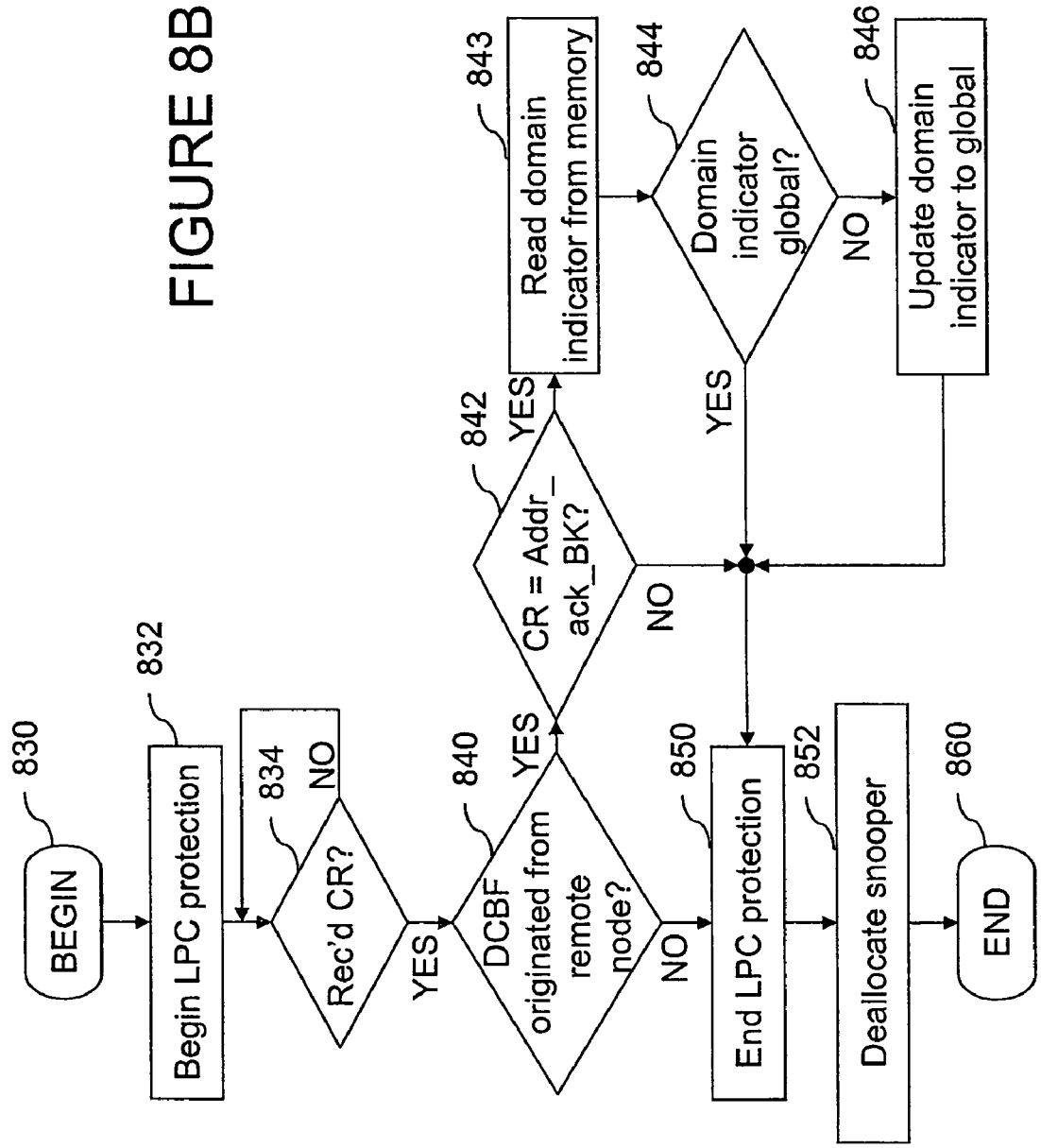
FIG. 8B is a high level logical flowchart of a process by a memory controller snooper handles a global DCBF operation in accordance with the present invention.

Referring now to FIG. 8B, there is depicted a high level logical flowchart of a process by a memory controller snooper (e.g., snooper 222) handles a global DCBF request in accordance with the present invention. As illustrated, the process begins at block 830 in response to the dispatch of a snooper 222 to handle a global DCBF request, as described above with reference to block 822 of FIG. 8A. The snooper 222 then begins to provide LPC protection for the address of the target memory block, as shown at block 832. While providing such protection, the snooper 222 provides a Retry_LPC partial response to operations having the same address as the target memory block. Next, at block 834, the snooper 222 awaits receipt of the combined response of the global DCBF operation.

The snooper 222 responds to the combined response in accordance with the relative location of the master 232 that initiated the global DCBF request (block 840). Thus, if the range bit within the snooped global DCBF request indicates that it originated from a remote processing node 102 (i.e., a processing node 102 other than the one containing snooper 222), the process passes to block 842, which is described below. If the global DCBF request did not originate from a remote processing node 102, but instead originated from within the processing node 102 of snooper 222, no update to the domain indicator 504 in system memory 108 is required. Consequently, snooper 222 simply ends its provision of LPC protection (block 850) and is deallocated by IMC 206 (block 852). Thereafter, the process ends at block 860.

Referring now to block 842, the snooper 222 allocated to handle the global DCBF request determines whether or not the associated combined response is an Addr_Ack_BK combined response. If not, the process passes to block 850, which has been described. If so, meaning that processing at the initiating master 232 is concurrently proceeding through blocks 620-626, the memory controller snooper 222 reads the domain bit 504 of the target memory block from system memory 108 (block 843), tests its value (block 844), and, if necessary, updates the domain bit 504 to indicate "global" (block 846). Following either block 844 or block 846, the process proceeds to block 850, which has been described.

Figure 9:
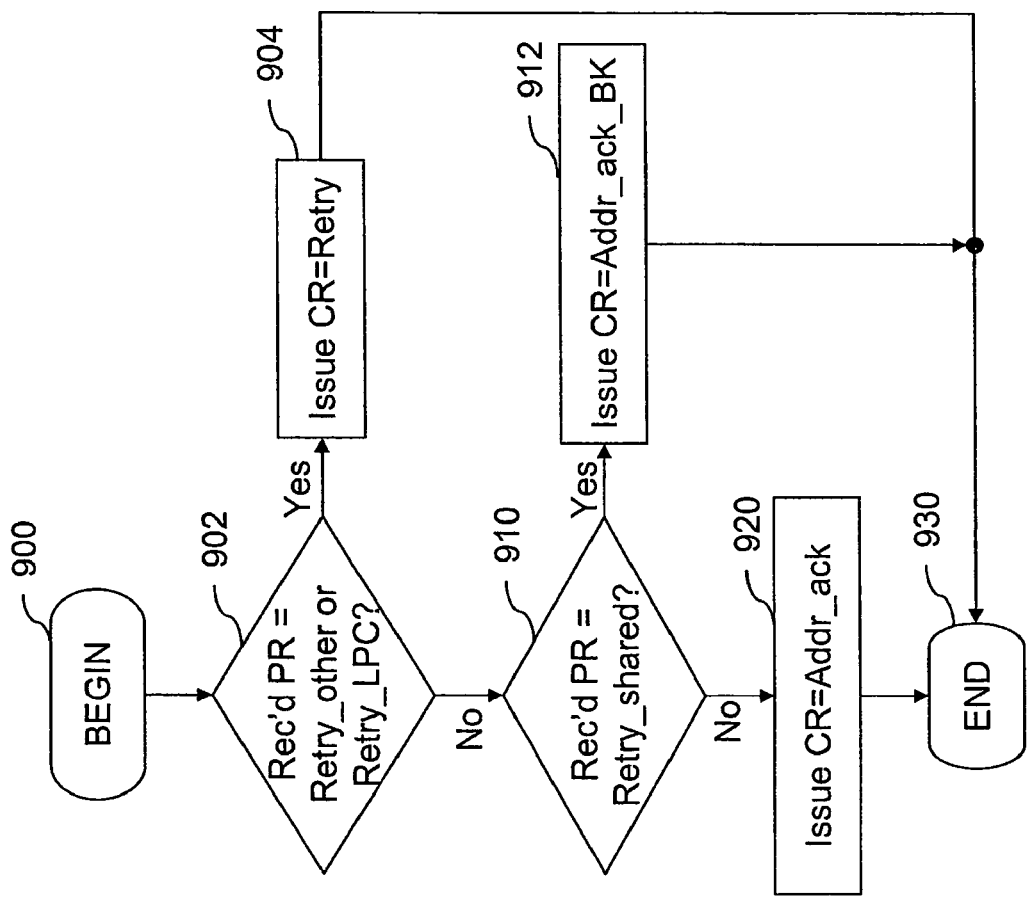
FIG. 9 is a high level logical flowchart of a process of providing a combined response to a global DCBF operation in accordance with the present invention.

With reference now to FIG. 9, there is illustrated a high level logical flowchart of a process by which response logic 210 generates a combined response of a global DCBF operation in accordance with the present invention. As shown, the process begins at block 900 and thereafter proceeds to block 902, which illustrates a determination by an instance of response logic 210 (e.g., the response logic 210 within the processing unit 104 of the master 232 that issued the global DCBF request) whether a partial response of Retry_other or Retry_LPC has been received in response to a global DCBF request. If so, response logic 210 generates and globally broadcasts a combined response of Retry (block 904) in order to signify that the global DCBF request must be reissued. Thereafter, the process terminates at block 930.

Returning to block 902, in response to response logic 210 determining that no Retry_other or Retry_LPC partial response was received, the process proceeds to block 910. Block 910 depicts response logic 210 determining whether a Retry_shared partial response was received for the global DCBF request. If so, response logic 210 generates and globally broadcasts an Addr_Ack_BK combined response (block 912) in order to indicate that at least one local or global background kill request must be issued to successfully complete the DCBF operation. Thereafter, the process terminates at block 930. If, however, response logic 210 determines at block 910 that no Retry_shared partial response was received for the global DCBF request, response logic 210 generates and globally broadcasts an Addr_ack combined response (block 920), indicating that the global DCBF operation was successful. Thereafter, the process shown in FIG. 9 ends at block 930.

As has been described, the present invention provides an improved data processing system, processing unit, cache hierarchy and method of data processing for handling flush operations in a data processing system having multiple coherency domains.

While the invention has been particularly shown as described with reference to a preferred embodiment, it will be understood by those skilled in the art that various changes in form and detail may be made therein without departing from the spirit and scope of the invention.

What is claimed is:

1. A method of data processing in a data processing system including at least first and second coherency domains, said first coherency domain containing a memory controller and an associated system memory having a target memory block identified by a target address, said method comprising:

in the first coherency domain, maintaining a domain indicator indicating whether said target memory block is cached outside said first coherency domain;

receiving in the first coherency domain a flush operation broadcast to said first and second coherency domains, said flush operation specifying said target address of said target memory block;

receiving in the first coherency domain a combined response to said flush operation representing a system-wide response to said flush operation;

in response to receipt in said first coherency domain of said combined response, determining if said combined response indicates that at least one cached copy of said target memory block may remain within the data processing system;

in response to a determination that said combined response indicates that at least one cached copy of said target memory block may remain in the data processing system, updating said domain indicator to indicate that said target memory block is cached outside of said first coherency domain, wherein said updating comprises updating said domain indicator only in response to a determination that said flush operation originated outside said first coherency domain; and a processing unit that initiated said flush operation issuing at least one kill operation to invalidate any cached copy of said target memory block in response to said combined response indicating that at least one cached copy of said memory block may remain in the data processing system, wherein said processing unit restricts a scope of said at least one kill operation to a single one of said at least first and second coherency domains that contains the processing unit in response a determination that a cache of said processing unit holds said target memory block in a cache state indicating said target memory block is cached only in a coherency domain among the at least first and second coherency domains containing said processing unit.

* * * * *